Dec. 9, 1958 L. SERVANTY 2,863,619
AERODYNE REMOTE CONTROL SYSTEM
Filed Jan. 16, 1956 9 Sheets-Sheet 4

Inventor
L. Servanty

Dec. 9, 1958 L. SERVANTY 2,863,619
AERODYNE REMOTE CONTROL SYSTEM
Filed Jan. 16, 1956 9 Sheets-Sheet 5

Inventor
L. Servanty

Dec. 9, 1958 L. SERVANTY 2,863,619
AERODYNE REMOTE CONTROL SYSTEM
Filed Jan. 16, 1956 9 Sheets-Sheet 7

Inventor
L. Servanty

Dec. 9, 1958 L. SERVANTY 2,863,619
AERODYNE REMOTE CONTROL SYSTEM
Filed Jan. 16, 1956 9 Sheets-Sheet 8

Inventor
L. Servanty
By (signature)
Attys.

2,863,619
Patented Dec. 9, 1958

United States Patent Office

2,863,619
AERODYNE REMOTE CONTROL SYSTEM

Lucien Servanty, Paris, France, assignor to Societe Nationale de Constructions Aeronautiques du Sud-Ouest, Paris, France Application January 16, 1956, Serial No. 559,380
Claims priority, application France January 21, 1955
19 Claims. (Cl. 244—14)

This invention relates to an aerodyne remote control system, wherein the stabilization of the aerodyne as well as, if required, other operations such as piloting, actuation of the landing gear, etc., are controlled from or through a station non-located on board the aerodyne, such as a ground station.

In a known type of aerodyne remote control systems, only the evolutions of the aerodyne are controlled from a remote station, while the stabilization and, hence, the conditions of flight, are solely determined by the own aerodynamic stability of the aerodyne. These known systems are, thus, exclusively adapted to remote control of short-range aerodynes effecting but limited evolutions, such as flying bombs, target aircraft or scale patterns.

In another known type of remote control system, the stabilization of the flight is ensured, on board the aerodyne, by means of an "automatic pilot," while the evolutions of the aerodyne are controlled from a remote station through the intermediary of said automatic pilot. This solution requires a heavy, complicated and, hence, expensive board equipment.

The main object of the invention is to provide a remote control system wherein the stabilization is effected under the exclusive control of mechanisms non-located on board the aerodyne, the said mechanisms being incorporated in a remote control station, e. g. a ground station, essentially comprising a computer interconnected with the aerodyne through a two-way radio-transmission, the said computer being adapted to elaborate the necessary stabilizing orders as a function of physical variables representing the instantaneous flight conditions, the said orders then being transmitted by radio to the aerodyne to be directly fed, on board the same, to servo-mechanisms acting upon aerodynamic intervention means adapted to ensure the stabilization of the aerodyne. These last means will be designated hereunder, for the sake of simplification, under the name of "Control surfaces" whatever may be their nature.

An essential advantage of this arrangement is that the stabilizing orders are carried out without any interpretation nor correction on board the aerodyne.

The above mentioned physical variables are constituted by the instantaneous values of functions corresponding to the flight conditions proper, at a given instant (such as anemometer speed, transversal acceleration, etc.) as well as to the positions of the control surfaces, at the same instant. It goes without saying that each one of the relevant physical variables is measured by means of a suitable apparatus and then transformed into a variable electrical effect. Similarly, the orders are elaborated by the computer in the shape of variable electrical effects, to be transformed, on board the aerodyne, by the servo-mechanisms, into mechanical actions to be exerted on the relevant control surfaces.

Another advantage of the remote control system according to the invention is to eliminate any interconnection, on board the aerodyne, between the control surface motor means and the apparatus provided to detect the conditions of flight. The required interconnection takes place exclusively through the intermediary of the remote control station.

Still another advantage of the remote control system according to the invention is to avoid the risks inherent with the presence, on board the aerodyne, of a highly qualified staff and exceedingly expensive equipment. The board equipment of the aerodyne is reduced to a strict minimum, which avoids unuseful spending of load and space. The remote control station, since it is not located on board the aerodyne, may comprise heavy apparatus without any restriction of weight, volume or complexity, these apparatus moreover being far less exposed to deterioration. Furthermore, the aerodyne is no more necessarily designed with a high degree of natural stability, the required stabilization being ensured exclusively by the remote control system.

A further object of the invention is to provide a remote control system of the type described, wherein the remote control station comprises means to inject into the computer control data calculated to cause a given evolution of the aerodyne, in order to keep it on a predetermined course or to bring it into a particular flight attitude, the said means being preferably provided with hand-controls for an operator.

Still another object of the invention is to provide visual display of the various measures of the physical variables defining the instantaneous flight conditions on a supervising instrument-panel similar to the usual instrument board of the aerodyne, whereby the operator disposes of all the necessary informations to guide, from the remote station, the evolutions of the aerodyne exactly as a pilot flying on instruments.

Another object of the invention is to provide the operator with hand-control means which will be called hereafter, as a whole, the "operator intervention set," and the aspect and arrangement of which are similar to the usual board pilot controls. In particular, there is preferably provided a swivelling operator's hand lever simulating the usual pilot-stick, as well as a steering swing-bar control of conventional type.

An additional object of the invention is to complete the above described system by remote controls for triggering, without any intervention of the computer, certain board mechanisms to be used only in certain conditions of flight such as gas-control, landing gear, air-brakes, etc (with a return supervising signalling system to check, on the instrument panel, the correct execution of such orders).

Still a further object of the invention is to provide a remote control system of the type described, wherein the informations concerning the conditions of flight and the positions of the control surfaces, as well as the orders originating in the operator intervention set, are materialized by direct currents having variable values and polarities, while the computer elaborating the final stabilizing orders, to be transmitted to the aerodyne from these data, uses electronic circuits adapted to effect additions of special type, hereinafter called "additions of the type specified," wherein each term is constituted by a variable affected with a suitably chosen coefficient.

A particular object of the invention is to provide a system of the type described, wherein the computer operates in two steps: in a first step, the computer combines together the data corresponding to the physical variables defining the aerodyne flight conditions proper (speed, flight attitude, accelerations, etc.), completed, if required, by the above mentioned supplemental data, in particular for remote piloting. This combination is effected by adding the said data in the manner specified above. The computer derives from this combination three voltages, hereafter called "pitch, roll and yaw voltages," defining the discrepancies between the actual attitude in space of the aerodyne relative to its pitch, roll and yaw axes and the ideal attitude it should assume at the considered instant. During the second step of the computation, the said three voltages are transformed into orders to be transmitted to the control surfaces, the respective functions of the various control surfaces, as well as the follow-up return data from the same, being taken into account.

This second step unit of the computer also effects additions of the type specified on electrical voltages and gives output voltages hereafter called "control surface actuating voltages." These voltages correspond, according to their value and/or polarity, to orders for displacing the relevant control surfaces in a given direction, the said orders being carried out, as already mentioned, on board the aerodyne, by the control surfaces of the same under the action of the board servo-mechanisms without any interpretation nor correction. As well known, the control surfaces (in the broad acceptation defined above) are adapted, not only to ensure the stabilization of the aerodyne, but also to cause various evolutions of the same. In the following description, as well as in the appended claims, for the sake of simplification, the functions of the control surfaces will not be distinguished, unless necessary for avoiding ambiguousness.

A more specific object of the invention is to provide a remote control system as described above, including the following elements:

(1) A set of flying instruments, on board the aerodyne, to detect the instantaneous flight conditions proper (speed, flight attitude, accelerations etc.).

(2) A set of instruments, on board the aerodyne, to detect the instantaneous positions of the control surfaces and to provide follow-up return data.

(3) A first multiplex transmission including a transmitting set on board the aerodyne and a receiving set at the remote control station, to ensure the transmission of the detected data from said aerodyne to said station.

(4) A remote control station including a computer permanently fed with the said data and elaborating the orders to be sent to the control surfaces.

(5) A second multiplex transmission including a transmitting set at the remote control station and a receiving set on board the aerodyne, to transmit to the latter the orders elaborated by the computers.

(6) A plurality of servo-mechanisms on board the aerodyne to actuate the control surfaces in response to the said orders.

In the case when the system is intended to ensure, not only stabilization, but also supplementary operations, it comprises, moreover, for this purpose:

In (2) means to detect (or give the follow-up return informations) on the positions of the supplementary mechanisms to be controlled.

In (3) supplementary transmission channels for this supplemental data.

In (4) (in the case when the supplementary operations are controlled by an operator).

(a) an instrument-panel for giving to the said operator any necessary informations concerning the conditions of flight, preferably in a shape similar to that of an instrument board.

(b) an operator intervention set including hand-controls, preferably in a shape similar to the usual board pilot controls.

In (5) supplementary transmission channel for the required supplementary orders and, In (6) supplementary servo-mechanisms for carrying out the said orders.

Preferred embodiments of the invention will be hereinafter described with reference to the accompanying drawings, given merely by way of example and in which:

Fig. 3 is a block-diagram of a remote control station adapted to be associated with the board equipment of Fig. 2a.

Since certain mechanisms, used in the remote control system according to the invention, are known per se, the same will be described but briefly hereafter, to the extent required for the understanding of the general design and operation of said system.

Figure 1:
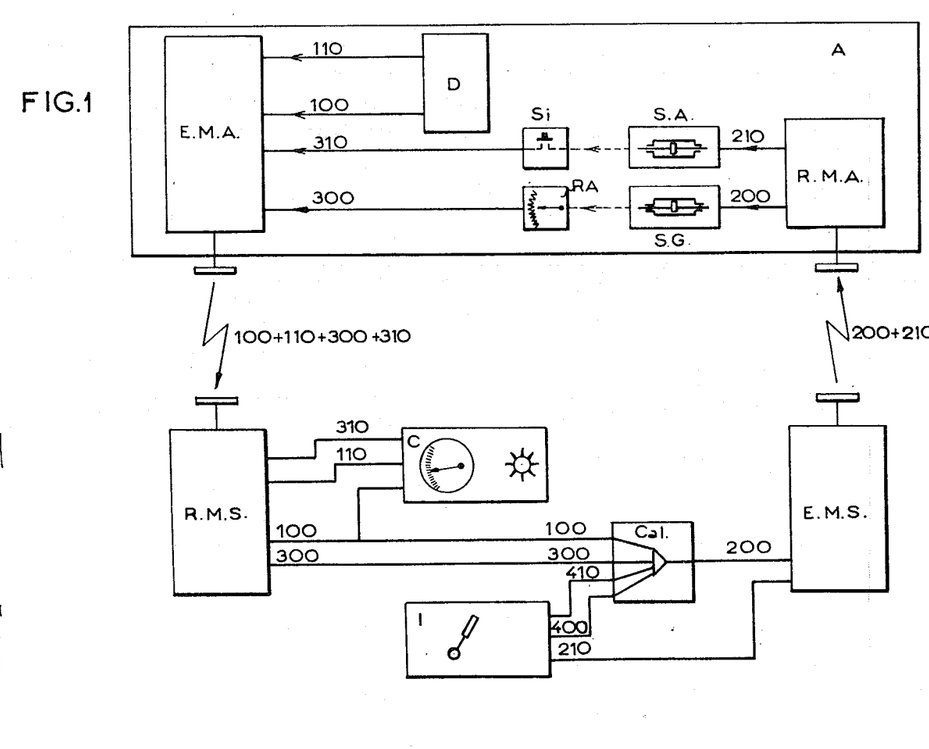
Fig. 1 is a general block-diagram showing the lay-out of a remote control system according to the invention, comprising an operator's intervention set, in particular for remote piloting.

Fig. 1 gives the general lay-out of a remote control system according to the invention, in an embodiment adapted to ensure a permanent automatic remotely-controlled stabilization, remote piloting by an operator and telecontrol by the same of other operations such as propelling, lowering and raising of the landing-gear, etc.

In the aerodyne generally designated by the block A, the orders transmitted from the remote control station, located e. g. on the ground, are received by a multiplex receiver RMA.

The said receiver gives separate output orders, on distinct channels, in the shape of varying electrical effects such as direct currents having their value and/or polarity variable in response to the incoming order signals.

The said output orders are of two kinds:

The orders transmitted on channels generally numbered 200 (one single channel being shown in the drawing) are intended to actuate the control surfaces to thereby ensure remote stabilizing and remote piloting, while the orders transmitted on channels, generally numbered 210, have for their function to actuate mechanisms intervening only during certain phases of the flight: gas control, landing gear, air-brakes, flaps, etc.

The orders 200 actuate suitable servo-mechanisms, such as S. G., controlling the displacement of the control surfaces (e. g. ailerons, vertical rudder, horizontal rudder, etc.). The said control surfaces (not shown) when displaced, act upon position detectors (or follow-up return indicators) such as RA, which transmit informations, through transmission channels 300, e. g. in the shape of a current, the function of which is to signal and check the execution of an order, as well as to permit the computer stopping the emission of the said order at the required instant.

The orders 210 may control supplementary mechanisms of which a non-limitative list is given herebelow.

Air-brakes (two positions: operative and retracted) (channel 211).
Super-sustaining flaps (two positions: normal flight and landing) (channel 212).
Landing gear (two positions: lowered and raised) (channel 213).
Gas control (two positions: stop and normal rating) (channel 214).
Wheel brakes (channel 215).

The controlling action takes place through servo-mechanisms such as SA (hydraulic jacks, electric servomotors). When the controlled member has been set into the desired position, an end-of-stroke switch, such as S$i$ establishes a circuit to send a current (channels 310) to thereby indicate that the order has been correctly executed.

The aerodyne further comprises a plurality of telemetering detectors D, the function of which is to transmit to the remote control station the instantaneous values of the physical variables defining the conditions of flight of the aerodyne, which variables are visually displayed at the operator's intervention set and/or transmitted to the computer. Among these detectors, may be found the hereinunder illustratively indicated apparatus.

Type 100 (Apparatus of which the readings intervene in the computer for remote stabilizing purposes) apparatus measuring the:

Anemometer speed (dynamic pressure) (101)
Pitch angular speed (102)
Roll angular speed (103)
Yaw angular speed (104)
Transverse acceleration (105)
Acceleration along the yaw axis (106)

Type 110 (Apparatus of which the readings are displayed on the instrument panel of the remote station without being fed into the computer) apparatus measuring the:

Altitude (117)
Course angle (119–120)
Longitudinal flight attitude (121)
Transverse flight attitude (122)

The readings of both type of apparatus are fed into the multiplex transmitter EMA of the aerodyne (channels 100 and 110).

The transmitter EMA of the aerodyne is a conventional multiplex transmitter capable of sending to the remote control station the readings of the detectors D (channels 100 and 110) as well as follow-up return data relating to the positions of the control surfaces (channels 300) and those of the other remotely controlled mechanisms (channels 310).

The remote control station comprises, in the example shown, a multiplex receiver RMS, an instrument-panel C, an operator's intervention set I, a computer Cal and a multiplex transmitter EMS.

The receiver RMS picks up the various signals transmitted through the channels 100, 110, 300, 310 and gives corresponding outputs on separate channels, e. g. in the shape of direct currents, the voltage and/or polarity of which are varied in response to the incoming data.

The channels 110 are interconnected with the instrument-panel C, whereon they actuate several apparatus; altimeter repeater, compass repeater, artificial horizon repeater, etc. The channels 310 are also interconnected with the instrument panel C whereon they operate signalling devices such as pilot lamps.

The channels 100 transmit the informations required for remote stabilizing (speed, accelerations, etc.). They are connected, on the one hand, with the instrument-panel, wherein they actuate corresponding measuring instruments and, on the other hand, with a computer wherein the said informations cooperate to the elaboration of the stabilizing orders. The informations transmitted through the channels 300 (control surface positions) are directly fed from the receiver RMS into the computer Cal.

The operator's intervention set I comprises remote piloting controls the positions of which determine the transmission of data, e. g. in the shape of currents (channels 400) to the computer. The said operator's set also includes means for compensating the control adjustments. The said compensating means also feed their outputs into the computer (channels 410). Finally, hand control knobs or handles are provided to send direct supplementary orders (channels 210) to the multiplex transmitter EMS.

Thus, the computer Cal receives, for example in the shape of variable direct currents, all data concerning the conditions of flight (channels 100), the follow-up return informations (control surface positions) (channels 300) and compensated remote-piloting orders (channels 400 and 410). In the specific computer described hereafter as a mere illustration, several additions of the type specified are effected on the said data by means of electronic adding units and the resulting outputs are voltages proportional to the orders to be transmitted to the control surfaces.

In order to explain how an addition of the type specified may result in elaborating an order capable of ensuring remote stabilizing of the aerodyne, a comparatively simple cases will be first assumed, viz. the control of a horizontal rudder. The output order to be generated by the computer will be a voltage V of the general following form:

$$v = a_1 O + a_2 C + a_3 P + a_4 \omega T + a_5 \Gamma N + a_6 B \qquad (1)$$

$a_1, a_2, a_3, a_4, a_5, a_6$ being coefficients depending on the specific structural design of the aerodyne, O a voltage proportional to the angular position of the simulated pilot-stick with respect to neutral position for horizontal rudder control, C a compensating voltage generated by the above mentioned means to determine the conditions of flight of the aerodyne without intervention of the operator, P a voltage proportional to the dynamic pressure, $\omega T$ a voltage proportional to the pitch angular speed, $\Gamma N$ a voltage proportional to the acceleration along the yaw axis and B a voltage proportional to the angular position or lock of the horizontal rudder.

When the aerodyne is in stable flight conditions, if the operator holds his pilot-stick in a certain position, the speed and hence the dynamic pressure are constant, the acceleration along the yaw axis has a well defined value, the same being true for the pitch angular speed. Thus, O, C, P, Γ and N have fixed values. The horizontal rudder thus assumes a well defined angular position corresponding to the assumed stable flight conditions, so that a fixed B voltage is transmitted. As a result, V also has a fixed value $V_0$ (for example nil). In these conditions, no order for modifying the horizontal rudder position is transmitted.

Now, if, due to a sudden wind perturbation or the like, tthe aerodyne deviates from its assigned course, the values C, P, Γ, N are varied and V assumes a new value differing from $V_0$, which determines the transmission of an order capable of so modifying the angular position of the horizontal rudder as to bring the aerodyne on its assigned course anew (regulating effect).

If the operator wishes to modify the flight conditions, he actuates his pilot-stick, which results in varying the value of the voltage O injected into the computer. This varies, in turn, the value of the voltage V (order to be sent to the horizontal rudder) and the angular position of said rudder is modified, which results in a corresponding variation of the aerodyne path. The values of C, P, Γ, N and B then vary, in turn, towards a new condition of equilibrium corresponding to the new position of the pilot-stick, the horizontal rudder effecting the various motions required to bring and maintain the aerodyne in a new attitude, corresponding to the said condition of equilibrium.

Referring again to Fig. 1, it may be seen that, in the example shown, the whole system comprises three types of circuits: the circuits for controlling occasional operations (gas control, flaps, brakes), the circuits affected to remote stabilizing and piloting and the circuits affected to mere telemetering purposes.

As already mentioned, the circuits of the first type only include conventional elements. They are independent and each of them comprises a hand-control, a transmission channel (210) between the transmitter of the remote control station and the receiver on board the aerodyne, a servo-mechanism (SA) acting on the movable member or structure to be displaced for carrying the order, whereupon the said member or structure triggers, at the end of its stroke, a switch $Si$ which, through a transmission channel (310), from the transmitter of the aerodyne to the receiver of the remote control station lights, for example a pilot-lamp on the instrument-panel to indicate to the operator that the order has been correctly carried out.

The remote stabilizing and piloting circuits each constitute, in contradistinction with those just described, a well defined assembly of elements which cannot be operated separately from each other. From the computer, a number of channels transmit the orders to the control surfaces (200) through the transmitter EMS of the control station and the receiver RMA on board the aerodyne, to actuate the servo-mechanisms (SG) of the control surfaces. The angular position of the latter is read by detectors (RA) and re-transmitted through a number of channels equal to the number of control surfaces (channels 300). On the other hand, the detectors D transmit the informations concerning the conditions of flight (channels 100). These informations are sent to the computer through the transmitter EMA of the aerodyne and the receiver RMS of the remote control station. The said informations are, furthermore, sent to the instrument panel. The orders for intervening on the control surfaces, affected by suitable compensating coefficients and originating from the operator's intervention set, are also transmitted to the computer, which elaborates the orders to be sent to the control surfaces in the above described manner.

Finally, the readings of certain detectors (e. g. altimeter and compass) are merely transmitted (channels 110) to the instrument-panel for the operator's own information. However, while this last type of circuits merely constitute telemetering appliances, they, nevertheless, intervene in the remote control system through the intermediary of the operator himself, who acts on the hand-controls of his intervention set (simulated pilot-stick and steering swing-bar) according to the indications of his instrument panel.

Figures 2A, 2B:
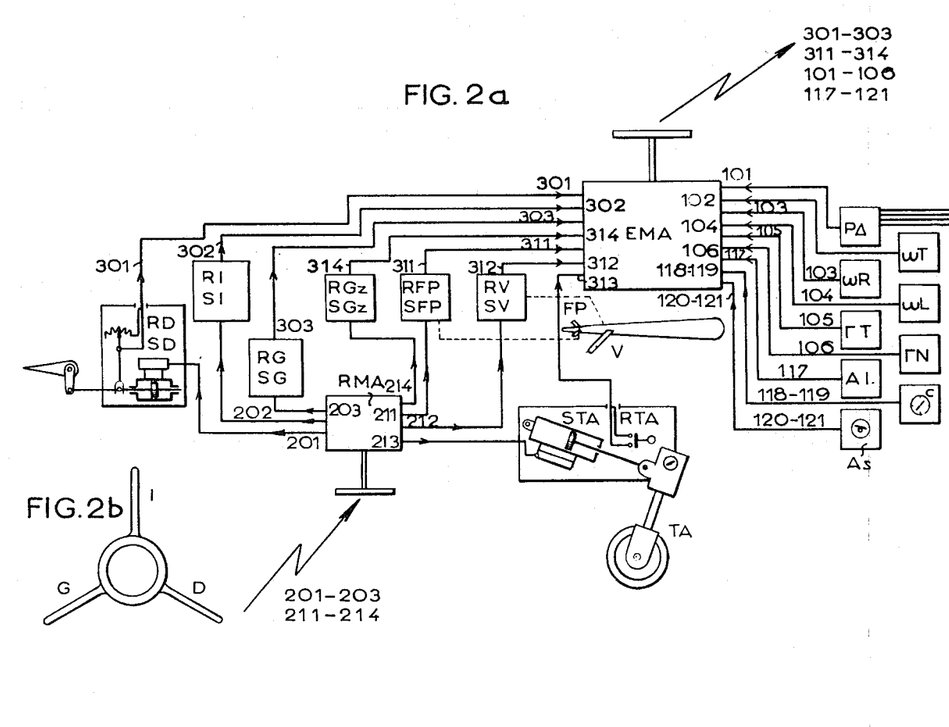
Fig. 2a is a block-diagram of the board elements of a system of the type shown in Fig. 1, for an airplane provided with control surfaces of particular design.
Fig. 2b is a rear view of said particular control surfaces.
Figure 3:
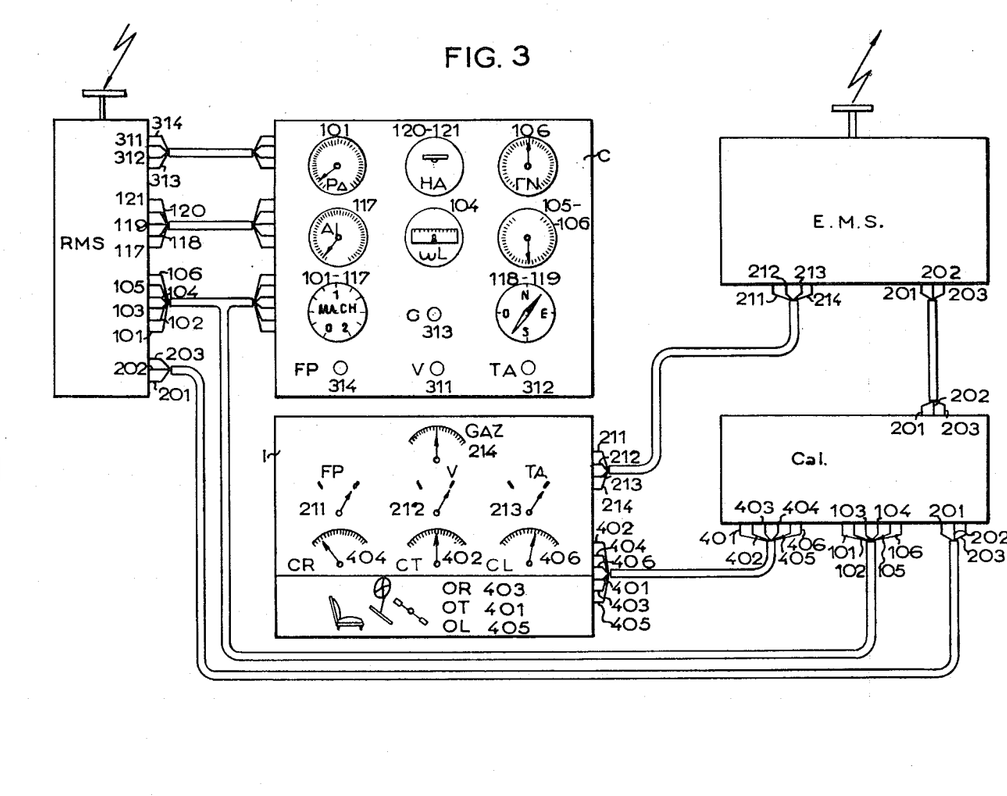
Figures 4, 4A, 4B:
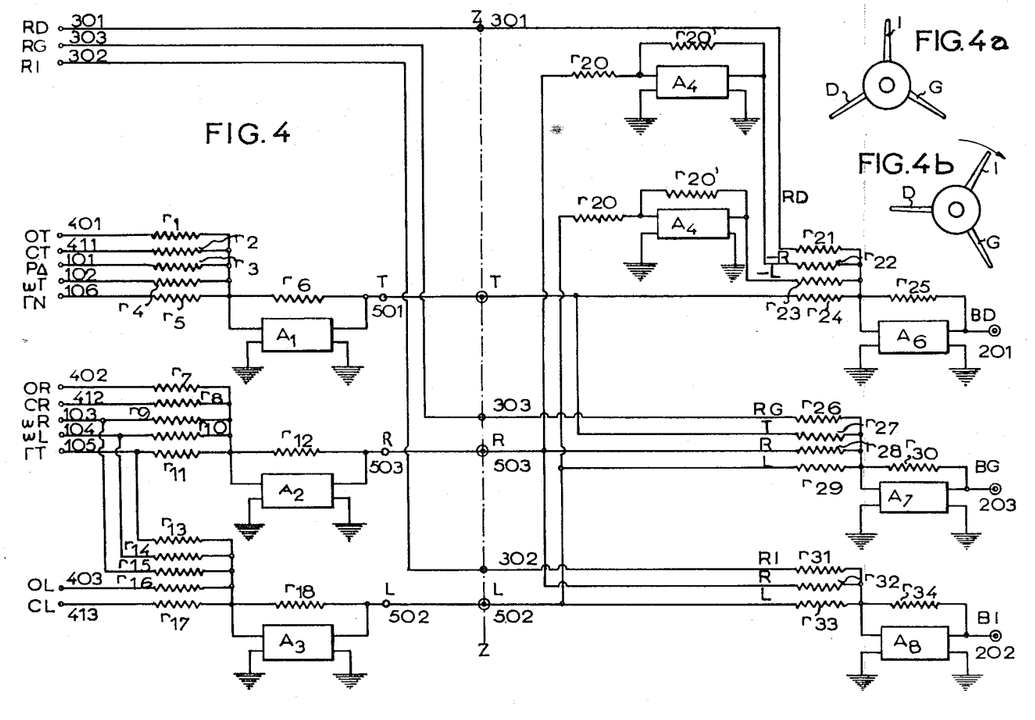
Fig. 4 is a general wiring diagram of a computer adapted to be used in the remote control station of Fig. 3.
Figs. 4a and 4b show two positions of the control surfaces of Fig. 2b to illustrate the remote action of the computer shown in Fig. 4.

Figures 2, 3 and 4 show details of the general layout of Figure 1, in a particular embodiment for an airplane provided with control surfaces of special design, as described in the application filed on February 17, 1953, Serial Number 337,403 for "Aircraft," by the applicant. As mentioned in the said prior application, in such a structure of control surfaces, no aileron is provided. The control is ensured by three tail rudders having the configuration of an inverted Y viz. a vertical rudder I, a left rudder G and a right rudder D (see Figure 2b).

Figure 2a is a block showing the board apparatus provided in this embodiment. Said apparatus comprise a multiplex receiver RMA, three rudder servo-motors SD, SI, SG, three rudder position detectors RD, RI, RG, the landing gear servo-motors STA, the servo-mechanisms of the gas control (SGz) of the flap control (SV), as well as of the air-brake control (SFP) with the corresponding end-of-stroke switches RTA, RGz, RV, RFP, the flight condition detectors PA, ωT, ωR, ωL, ΓT, ΓN, $Ai$, C, $As$ and a multiplex transmitter EMA.

The multiplex transmission between such an airplane and the remote control station is ensured by a conventional system of carrier currents, the various channels being frequency-modulated. This system being known per se, it will not be described in detail hereunder, the principle being merely briefly explained as follows:

In the illustrative embodiment described, the receiver RMA is provided with seven input channels, each carrying a given order viz.

Channels 201, 202, 203, for receiving the orders to be transmitted to the rudders, Channels 211, 212, 213, 214, affected to the orders for supplementary controls (gas, brakes, flaps, landing gear).

The reception and amplification are affected by "frequency conversion" and the demodulation is ensured by a frequency discriminator. A description of such a receiver may be found in "Radio Engineers Handbook," Terman, pages 585 to 588.

The separation of the order carrying channels comprised in the composite signal derived from the discriminator is effected by means of filters similar to those used in carrier current telephone racks.

The frequency-modulated carrier current of each channel is, then, sent to another discriminator restituting the orders received in the shape of a voltage (such a system has been described in "Techniques de l'Ingénieur, Electronique," volume 2, chapitre E, 3200-3-4).

The transmitter is provided with eighteen channels viz. eleven channels for telemetering transmissions, three channels for follow-up return data from the rudders and four channels for signalling the positions of the supplementary controls.

Each telemetering, follow-up return or position indicating signal modulates an oscillator, the mean frequency of which identifies the channel. Frequency-modulation is used here also, as described in "Techniques de l-Ingénieur, Electronique," volume 2, chapitre E, 3200-6-7. According to the specific type of detector, the modulation takes place as follows:

| Type of variable electrical effect generated by the detector | Mode of modulation |
| --- | --- |
| Voltage | Reactance tube described in "Radio Engineers Handbook," Terman, 7, pages 592-595. |
| Inductance | Incorporation of the inductance coil in the oscillating circuit of the oscillator. |
| Capacity | Incorporation of a condenser in the oscillating circuit of the oscillator. |

The various channels modulating the carrier wave are mixed together according to the art of the carrier-currents, as described in "Techniques de l'Ingénieur, Electronique," volume 2, chapitre E 3200.

The mode of modulation adopted is the frequency modulation described in "Radio Engineers Handbook" Terman, 7, pages 582 to 585. The high-frequency transmitter used has been described in "Techniques de l'Ingénieur, Electronique," volume 2, chapitre E 3100-4.

Figure 5:
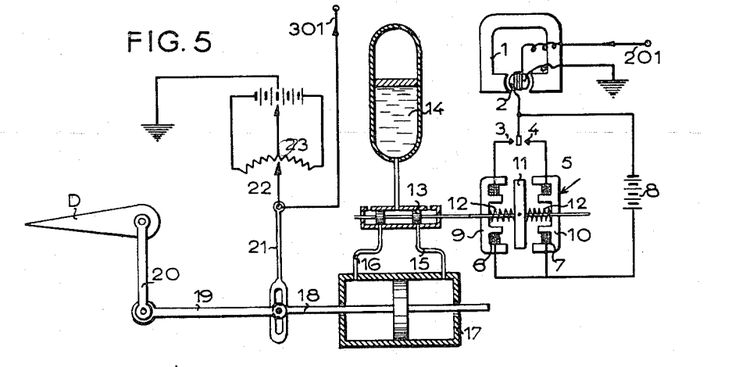
Fig. 5 is a diagrammatic, partly sectional, view of a control surface servo-mechanism provided with means for signalling the execution of an order by the said control surface.

The orders for varying the angular position of the rudders (channels 201, 202, 203) are sent to three identical servo-motors SD, SI, SG. Figure 5 shows diagrammatically the general design of such servo-motors, as well as the associated system provided for detecting the angular position of the relevant rudder. The current corresponding to the order (201) is fed into the coil of a differential relay 1. The movable contact of the said relay assumes its neutral position when its coil is dead. As the relay 1 is operated, the said movable contact is pressed, according to the polarity of its energizing current, either on the fixed contact 3, or on the fixed contact 4, which results in feeding one of the two coils 6 or 7 of an electric relay 5 with current from a battery 8. The moving armature 11 of the relay 5 is mounted on the movable member 12 of a hydraulic distributor 13. In the absence of any current, the moving armature 11 is maintained in neutral position, between the two fixed armatures 9 and 10 of the relay 5, by means of return-to-neutral springs 12. When, for example, the coil 7 is operated, the armature 11 is attracted towards the right and moves correspondingly the movable member of the distributor 13. The said member normally obturates two ducts 15 and 16, respectively communicating with the opposed compartments of a hydraulic jack 17. As the relay 5 actuates the distributor, one of the said jack compartments is set into communication with a source of pressure oil 14 constituted, for example, by a hydraulic accumulator, which causes a displacement of the piston of the jack 17 in the direction opposed to the direction of displacement of the distributor movable member. When the latter reassumes its neutral position, the piston of the jack 17 is locked in the position it has assumed, due to obturation of the corresponding duct by the distributor. The piston transmits its motion to the rudder D through a piston-rod 18, a connecting rod 19 and a lever 20. The piston-rod 18 also actuates a lever 21, controlling the sliding arm 22 of a potentiometer 23, giving a voltage proportional to the angular position of the rudder which voltage is transmitted to the channel 301. It is to be noted that the control of the rudders exclusively depends on the order voltages transmitted through the channels 201, 202 and 203.

Figure 6:
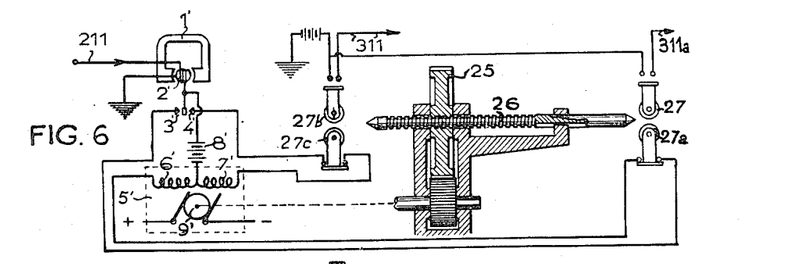
Fig. 6 is a diagrammatic, partly sectional, view of an electric jack constituting a servo-motor for an auxiliary mechanism such as a landing gear actuating mechanism.

Other supplementary controls, such as that of the landing gear, may be ensured by a similar servo-mechanism, except that the follow-up return system (21 to 23) is replaced by a simple end-of-stroke contact as indicated in Fig. 2 (RTA). The said supplementary controls may be ensured also by means of an electric jack as shown in Fig. 6.

The order transmitted through the channel 211 acts, here also, on the coil 2' of a differential relay 1' establishing no circuit when no current is transmitted through the channel 211. In response to the transmission of an order, the movable contact of the said relay interconnects, according to the polarity of said current, either a contact 3' or a contact 4' with a battery 8' thus selectively feeding one of the field windings (6' or 7') of an electric motor 5', the rotor 9' of which is permanently fed with direct current so that the said motor rotates in a selectively determined direction. The said motor drives, through a spur pinion, a toothed wheel 25, the innerly threaded bore of which displaces in either direction a screw 26 held against rotation. As the said screw reaches the end of its stroke, it actuates a normally-opened switch 27 (or 27b) to emit a signalling current, such as 311a (or 311) and a normally-closed switch 27a (or 27c) which interrupts the previously energized circuit of the motor.

In the drawing, the following supplementary controls have been shown as a mere illustration:

|  | order on channel | servo-motor | end of stroke | signalling on channel |
|---|---|---|---|---|
| Control of the airbrakes | 211 | SFP | RFP | 311 |
| Control of the supersustaining flaps | 212 | SV | RV | 312 |
| Gas control | 214 | SGz | RGz | 314 |
| Landing-gear control | 213 | STA | RTA | 313 |

The set of detectors D includes, for example, the hereafter enumerated apparatus:

| Physical variable to be measured | Type of detector | Varying electrical effect used as input to the multiplex transmission | Channel number |
|---|---|---|---|
| Anemometer speed (dynamic pressure) PΔ. | Differential diaphragm-box communicating with a Pitot tube and actuating the movable core of an inductance coil. | Variable inductance | 101 |
| Pitch angular speed ωT | Pitch-responsive gyrometer driving a potentiometer. | Variable electric voltage. | 102 |
| Roll angular speed ωR | Roll-responsive gyrometer driving a potentiometer. | do | 103 |
| Yaw angular speed ωL | Yaw-responsive gyrometer driving a potentiometer. | do | 104 |
| Transverse acceleration ΓT | Accelerometer driving the movable armature of a condenser. | Variable capacity | 105 |
| Acceleration along the yaw axis ΓN | do | do | 106 |
| Altitude Al | Vacuum aneroid diaphragm box driving the movable core of an inductance coil. | Variable inductance | 117 |
| Course angle | Gyro-magnetic compass Sperry CL2 with selsyns. | Variable electric voltages. | {118 119 |
| Longitudinal and transversal flight attitudes. | Flight attitude gyro driving two potentiometers. | do | {120 121 |

Since the measuring apparatus used as detectors are all of conventional type, only a brief description of the manner in which the measures are transformed into variable electrical effects will be given hereunder.

Figure 7:
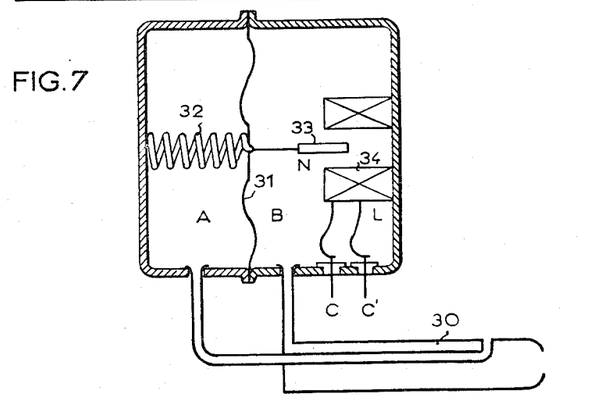
Fig. 7 is a diagrammatic, partly sectional, view of an anemometer with means for transforming its indications into a variable electrical effect (for example a coefficient of variable self-induction hereafter called, by simplification, "variable inductance").

Figure 7 shows the principle of the transmission of the anemometer speed. The two ducts giving the static and total pressures, respectively, of a Pitot tube communicate with a differential diaphragm on either side of a diaphragm 31, permanently subjected to the action of a spring 32 and displacing the core 33 of a coil 34 to vary the value of the inductance of said coil.

Figure 8:
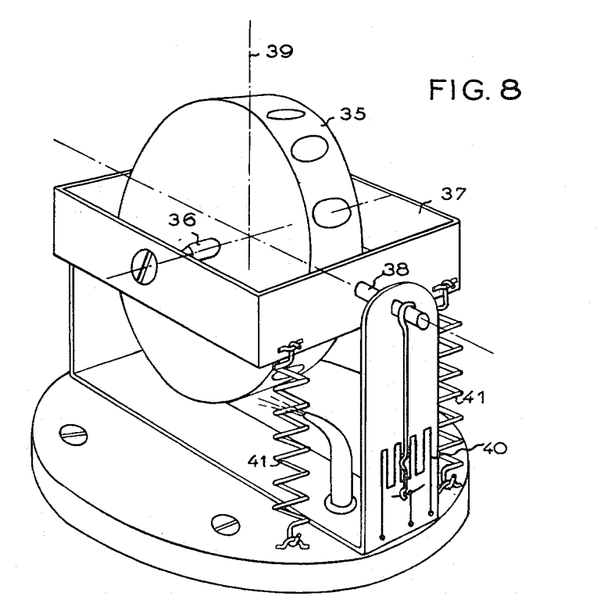
Fig. 8 is a perspective view of a gyrometer with means for transforming the indications of the same into a variable electrical effect (variable voltage).

Fig. 8 shows the principle of a yaw-responsive gyrometer, as well as the transformation of its indications into a variable electrical effect. An axle 38, journalled in bearings, is fast with the gimbal-ring 37 of the gyro of which the rotor 35, permanently driven by a pneumatic nozzle, rotates around a shaft 36 at right angles to the axle 38. Any angular displacement of the airplane around its yaw axis 39, extending at right angles with both geometrical axes of the axles 36 and 38, causes a gyroscopic reaction and, hence, an angular displacement of the gimbal-ring 37 around the axle 38. The sliding contact arm of a fixed potentiometer 40, which arm is fast with the axle 38, transforms the said angular displacement into a variable voltage. Springs 41 permanently urge the gimbal-ring 37 into neutral position.

Figure 9:
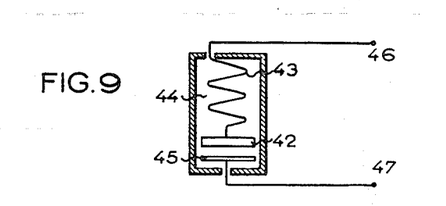
Fig. 9 is a diagrammatic sectional view of an accelerometer with means for transforming its indications into a variable electrical effect (variable capacity).

Fig. 9 shows the principle of accelerometer. The same is essentially constituted by a weight 42 loaded by a spring 43 and the displacements of which are damped by means of an oil bath 44. The weight 42 constitutes the moving armature of a condenser capable of being displaced, under the action of acceleration, with respect to a fixed armature 45, whereby the capacity across the terminals 46—47 varies with acceleration.

Figure 10:
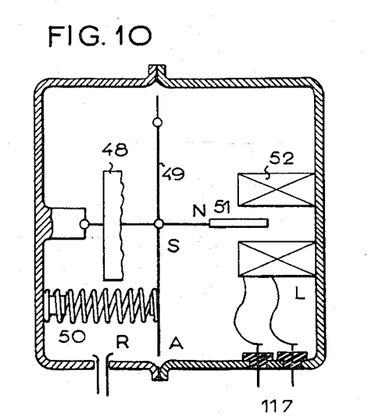
Fig. 10 is a partly sectional, diagrammatic view of an altimeter with means for transforming its indications into a variable electrical effect (variable inductance).

Fig. 10 shows the principle of an altimeter the indications of which are transformed into a variable electrical effect. The vacuum aneroid diaphragm-box 48 responsive to the pressure of the enclosure displaces, as a function of the static pressure, a lever 49 loaded by a calibrated spring 50. The lever 49 actuates the moving core 51 of a coil 52 to vary the inductance of the same.

Figure 11:
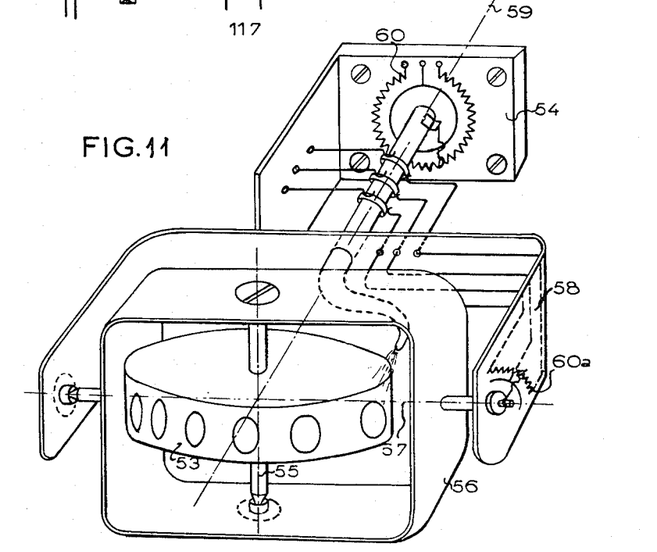
Fig. 11 shows an artificial horizon with means for transforming its indications into variable electrical voltages.

Fig. 11 shows a flight attitude gyro indicating the roll and pitch inclinations of the aerodyne. In the example shown, this apparatus constitutes the transmitting detecting means of the device described in the copending application filed this same day by the applicant for: "Artificial Horizon Repeater."

A gyro-rotor 53, continuously driven by a pneumatic nozzle, has its rotation axis 55 held in the apparent vertical direction of the aerodyne by the usual gyroscopic effect combined with the action of gravity means not shown. The shaft 55 of the rotor is freely journalled in a gimbal-ring 56 freely journalled, in turn, around an axis 57 extending at right angles with the geometrical axis of 55 and located in the plane of rotation of the rotor 53, on a stirrup-member 58 freely pivoted around an axis 59 intersecting the axes 55 and 57 at the rotor centre of rotation on a fixed support 59 fixedly secured on the airplane in such a manner that the axis 59 be parallel to the roll axis, while the axis 57 is parallel to the pitch axis (or vice-versa). Two potentiometers 60, 60a are provided to measure the angular displacements of the support 54 and, hence, of the airplane around the axis 59 as well as the angular displacements of the assembly 54, 58 and, hence, of the airplane around the axis 57, respectively, so that they generate two voltages varying as a function of the longitudinal and transversal flight attitudes.

The outputs of the detectors D modulate the corresponding channels (101, 102, 103, 104, 105, 106, 117, 118, 119, 120, 121) of the transmitter EMA.

Fig. 3 shows diagrammatically the equipment of the remote control station. The receiver RMS and the transmitter EMS are similar to those of the airplane except that the receiver RMS comprises eighteen channels while the transmitter EMS only includes seven channels. Further to the transmission apparatus, the station comprises an instrument-panel C, the operator's intervention set I and the computer Cal.

At the output of the receiver RMS, the eighteen channels are separated from each other and transmit direct currents, the value of which varies as a function of the transmitted data.

The channels outputs 311, 312, 313, 314 are sent to the instrument-panel whereon they actuate, either directly or through suitable relays, pilot-lamps:

V—lit when the flaps are open
TA—lit when the landing gear is lowered
FP—lit when the air-brakes are open
G—lit when the gas control is throttled-up to a maximum.

The channels 117, 118, 119, 120, 121 transmit the measures corresponding to the altimeter, the flight attitude gyrometer and the compass to the instrument-panel.

The channels 101—106 transmit the voltages corresponding to the anemometer speed, the pitch, roll and yaw angular speeds, the normal and transverse accelerations, on the one hand, to the instrument-panel and, on the other hand, to the computer.

Finally, the channels 201, 202 and 203 send to the computer voltages corresponding to the positions of the rudders.

The instrument-panel C comprises, further to the above-mentioned pilot-lamps, the following apparatus constituted by conventional measuring instruments.

| Type of measuring apparatus of which the readings are reproduced by the repeater | Conventional measuring instruments used | Channels feeding the repeater |
| --- | --- | --- |
| Anemometer PA | Voltmeter graduated in speed units. | 101 |
| Altimeter Al | Volmeter graduated in altitude-pressure units. | 117 |
| Machmeter M | Ratiometer graduated in Mach number. | 101/117 |
| Normal accelerometer ΓN | Voltmeter graduated in "g". | 106 |
| Turn indicator ωL | Voltmeter graduated in angular speed units. | 104 |
| Compass | Ratiometer graduated in course angle units. | 118/119 |

Further to these apparatus, the instrument-panel C comprises an artificial horizon repeater reproducing the longitudinal and transversal flight attitude indications (channels 120—121) in the conventional shape usually found on an instrument-board (Figs. 16a to 16d). The voltages corresponding to the transversal flight attitude (channel 120) and to the longitudinal flight attitude (channel 121) are direct current voltages.

In the example shown, the artificial horizon repeater is similar to the receiver of the device described in the above mentioned copending application. It is essentially constituted by a cathode-ray tube 70 (Fig. 16a) comprising an electron-gun 71, horizontal deflecting plates 72, vertical deflecting plates 73 and, moreover, a magnetic additional vertical deflecting coil 74 (the various feeding circuits of the cathode-ray tube, cathode heating circuit, anode circuit, post-acceleration circuit, etc. have not been shown). The horizontal deflecting plates 72 are fed from a source of alternating current 75 having a suitable frequency (for example a 50 C. P. S. supply mains).

Figures 15, 16A, 16B, 16C, 16D:
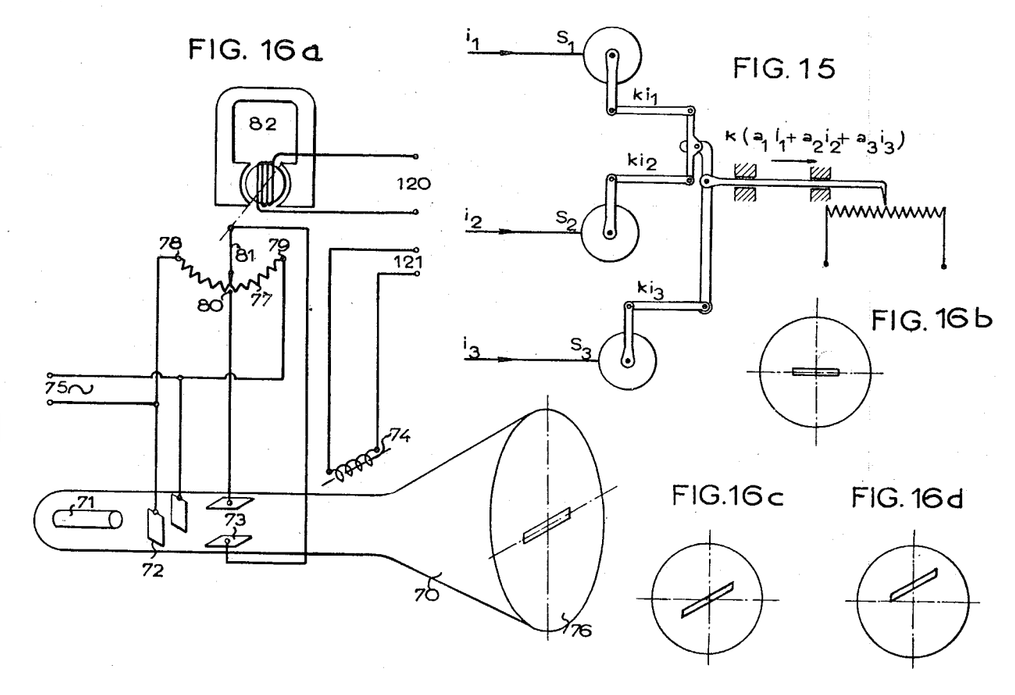
Fig. 15 is a diagrammatic view of a mechanism adapted to effect additions of the type specified.
Fig. 16a is a diagrammatic view of the receiver of an artificial horizon repeater giving, on the instrument panel of the remote control station, a permanent indication of the flight attitude of the aircraft.
Fig. 16b is a diagrammatic view showing the linear trace produced by the receiver of Fig. 16a in a horizontal reference attitude position.
Figs. 16c and 16d are diagrammatic views showing the same linear trace in different positions relative to said horizontal reference attitude position and indicating the attitude of the aircraft with respect to pitch and roll axes.

In the absence of any vertical deflecting voltage, the spot describes on the screen 76 of the cathode-ray tube a horizontal rectilinear path passing through the centre of said screen (Fig. 16b). A potentiometer 77 has its terminals 78 and 79 fed from the same alternating current source as the horizontal deflecting plates, while a mid-tap 80 on said potentiometer is connected with one of the vertical deflecting plates, the other one of the latter being connected with the sliding contact arm 81. Then, it will be easily understood that, according to the position of the sliding contact arm, the spot will describe either a horizontal rectilinear path (sliding contact arm in mid position) (Fig. 16b) or a more or less inclined rectilinear path (sliding contact arm shifted e. g. towards the left relative to its zero position) (Fig. 16c). The sliding contact arm 81 of the potentiometer is mechanically connected with the frame of a moving frame measuring apparatus 82 fed with the voltage corresponding to the transversal flight attitude (channel 120). According to the value of the said voltage, the path described by the spot will be either horizontal or more or less inclined, thus figuring the transversal flight attitude of the airplane.

The additional vertical deflecting coil 74 is fed with a voltage corresponding to the longitudinal flight attitude of the airplane (channel 121); if the said voltage is nil, the figurating replica constituted by the rectilinear path of the spot will pass through the centre of the screen 76 (Figs. 16b or 16c); if the said voltage has a value differing from zero, the said path will be shifted upwardly or downwardly according to the longitudinal flight attitude of the airplane (Fig. 16d).

Thus, the instrument-panel C gives to the operator any required information relating to the conditions of flight, exactly in the same shape as on a conventional board artificial horizon.

The operator's intervention set is provided with switches giving, according to their position, either a negative or a positive current directly modulating the channels 211, 212, 213, 214 of the remote station transmitter for remotely controlling the aerodyne gas control, air-brakes, super-sustaining flaps and landing gear, respectively. The said operator's set furthermore comprises the remote piloting controls proper which are designed in the manner of real piloting controls. They include, in front of the seat of the operator (Fig. 12): a steering swing-bar 50 driving a potentiometer 51 to thereby generate a voltage proportional to the displacement of the sliding contact arm of said potentiometer relative to its neutral position (channel 405). Return-to-neutral springs 52 are associated with the steering swing-bar 50, so that the operator necessarily exerts a stress for actuating this control; a simulated pilot-stick 53 provided with a steering-wheel 54. The stick 53 actuates when pulled or pushed longitudinally a potentiometer 55 to give the orders "nose-up-nose-down" in the shape of a voltage (channel 401) proportional to the angular position of the stick 53. The same is associated with return-to-neutral springs 56 through a suitable lever. Due to the presence of said springs, the operator has to exert a certain stress to push or pull the pilot-stick out of its neutral position. The hand-wheel 54 drives a potentiometer 57 giving the bank or turn orders in the shape of a voltage (channel 403) proportional to the angular position of its sliding contact arm with respect to zero. The said steering-wheel is also urged into neutral position by two spiral-springs (not shown).

Figures 12, 13, 14A, 14B:
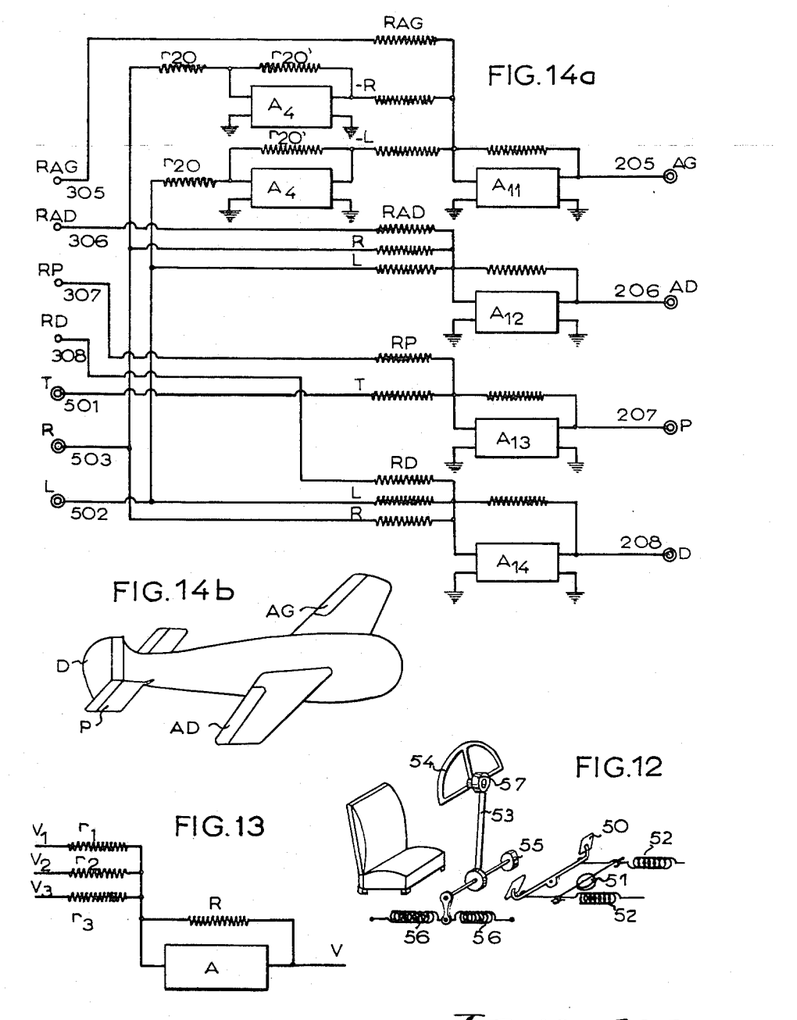
Fig. 12 is a diagrammatic perspective view of an operator's intervention set with simulated pilot-stick and steering swing-bar.
Fig. 13 is a block diagram of an electronic computer adding unit.
Fig. 14a is a block diagram of the second step unit of a computer similar to Fig. 4 in an alternative embodiment adapted to a conventional airplane with control surfaces of the usual type.
Fig. 14b is a diagrammatic perspective view of such control surfaces.

Finally, the operator's intervention set still comprises three compensating potentiometers CT, CR, CL (channels 402, 404, 406) to permit eliminating the influence of the operator's own reactions in any flight conditions.

Fig. 4 gives a simplified wiring diaphragm of the computer Cal of Fig. 3. The said computer comprises two main units; in the first unit, shown on the left of the dot-dash line ZZ, the informations given by the flight condition detectors (channels 101, 102, 103, 104, 105 and 106) are combined with the orders given by the operator (channels 401, 402, 403) as well as with the currents originating in the compensating circuits (channels 411, 412, 413). This combination generates three output voltages respectively called the pitch-voltage T, the roll-voltage R and the yaw-voltage L, the values of which correspond to the evolution to be imparted to the airplane (for example nose up or down, left or right turn, left or right bank, etc.). In the right-hand portion of the computer, the three voltages TRL are combined together as well as with the follow-up return data (channels 301, 302, 303) to generate the final orders to be transmitted to the control surfaces, which orders will be carried out on board the airplane without any interpretation nor correction.

As mentioned above, in the assumed example, the control surfaces only include three rudders I, D, G.

As indicated above, the computer comprises electronic circuits capable of effecting additions of the general form.

$$V = a_1 V_1 + a_2 V_2 + \ldots + a_n V_n \quad (2)$$

$a_1$, $a_2$, $a_n$ being positive or negative coefficients materialized by the settings of potentiometers.

Such circuits (cf. Fig. 13) have been described in "Electronic Analogue Computers"; Korn and Korn; page 10 to 16. Each adding unit is constituted by input circuits fed with the voltages $V_1$, $V_2$, $V_3$ and each comprising a resistor $r_1$, $r_2$, $r_3$ etc., the ohmic values of which are proportional to the coefficients $a_1$, $a_2$, $a_3$ etc. The terminals of the said resistors are interconnected together and feed a direct current amplifier $A_1$ having a high amplification factor; the output of said amplifier is returned to its input through a resistor $r_6$ introducing a negative feed-back. It may be shown that the general output voltage V actually offers the above given form (Equation 2).

As already mentioned, the first left-hand unit of the computer comprises pitch, roll and yaw circuits as follows:

The pitch circuit operates on the voltages generated by:

The potentiometer of the pilot-stick which, when the same is displaced longitudinally, gives the orders nose-up/nose-down OT, channel 401.
The compensating potentiometer CT, channel 411.
The dynamic pressure PΔ, channel 101.
The pitch angular speed ωT, channel 102.
Normal acceleration accelerometer ΓN, channel 106.

The voltages OT, CT, PΔ, ωT and ΓN are sent as inputs into the direct current amplifier $A_1$, through the resistors $r_1$, $r_2$, $r_3$, $r_4$, $r_5$, the output of $A_1$ is returned to its input through the resistor $r_6$. There is obtained, at the output (channel 501) the pitch voltage T, as follows:

$$T = a_1(OT) + a_2(CT) + a_3(P\Delta) + a_4(\omega T) + a_5(\Gamma N) \quad (3)$$

the values of $a_1$, $a_2$, $a_3$, $a_4$, $a_5$ depending on the ohmic values of the resistors $r_1$ to $r_6$.

As described with reference to Fig. 1, (OT), (CT), (PΔ), (ωT) and (ΓN) have constant values for given conditions of flight. A well defined voltage T corresponds to these values. Any accidental modifying of the conditions of flight increases or decreases the value of the voltage T to cause a reaction of the control surfaces tending to bring the airplane on its assigned course anew. If the operator modifies the position of the intervention controls, OT varies thus causing an angular displacement of the control surfaces and a variation of the values of (PΔ), (ωT) and (ΓN) until a new state of equilibrium is obtained. By varying the value of CT, it is possible to adjust the value of the voltage T which defines a given state of equilibrium.

The control circuit operates on voltages issuing from:

The potentiometer of the pilot stick steering wheel OR, channel 402.
The roll compensating potentiometer CR, channel 412.
The roll angular speed ωR, channel 103.
The yaw angular speed ωL, channel 104.
The transversal acceleration ΓT, channel 105.

The said voltages are fed through resistors $r_7$, $r_8$, $r_9$, $r_{10}$, $r_{11}$ as inputs to a direct current amplifier $A_2$, the output of which is returned to its input through a resistor $r_{12}$. There is obtained at the output the voltage R (channel 503) which has the general form:

$$R = b_1(OR) + b_2(CR) + b_3(\omega R) + b_4(\omega L) + b_5(\Gamma T) \quad (4)$$

In this case also, the values of (OR), (CR), (ωR), (ωL), (ΓT) are constant for stable conditions of flight; if, however, the roll conditions of the airplane happen to be varied due to a sudden wind perturbation etc., the values (ωR), (ωL), (ΓT) are varied accordingly and modify in turn the value of the voltage R, thus causing a reaction of the control surfaces tending to reassume the prior conditions. Similarly, if the operator modifies the transverse position of its pilot-stick, this varies the value of the voltage R, the control surfaces are actuated in the suitable direction until a new state of equilibrium is obtained as well as a stabilization of (ωR), (ωL), (ΓT).

Finally, the yaw circuit operates on the voltages issuing from:

The potentiometer of the steering swing-bar OL, channel 403
The yaw compensating potentiometer CL, channel 413
The roll angular speed ωR, channel 103
The yaw angular speed ωL, channel 104
The transversal acceleration ΓT, channel 105

These voltages are fed through resistors $r_{13}$ to $r_{17}$ to the input of a direct current amplifier $A_3$, the output of which is returned to its input through a resistor $r_{18}$ and there is obtained, at the output, the yaw voltage L which has the general form:

$$L=c_1(OL)+c_2(CL)+c_3(\omega R)+c_4(\omega L)+c_5(\Gamma T) \quad (5)$$

Here again, for stable conditions of flight, the values (OL), (CL), ($\omega R$), ($\omega L$), ($\Gamma T$) are constant, so that L also has a constant value. Now, if due to a sudden wind perturbation, etc. ($\omega R$), ($\omega L$) or ($\Gamma T$) are accidentally varied, the value of L is modified, which tends to bring the airplane on its assigned course anew. If, on the one hand, the operator acts upon the steering swing-bar, OL is varied and modifies the value of L, the control surfaces are actuated to vary the actual path of the airplane and ($\omega R$), ($\omega L$), ($\Gamma T$) are also varied until the said values are stabilized for a new value of L corresponding to the new conditions of flight established by the operator.

At the output of this first unit of the computer, the three following voltages are thus available:

The pitch voltage T indicating if the airplane should nose-dive or nose-lift

The roll voltage R indicating if the airplane should effect a left or right bank The yaw voltage L indicating if the airplane should turn towards the left or towards the right.

The second unit of the computer transforms the said voltages in other voltages identifying the orders to be carried out by the three rudders I, D, G which receive the said order voltages indicating, according to their polarities or value, in which direction and to which extent the control surface should be displaced.

This second unit of the computer comprises a number of circuits equal to the number of control surfaces. Thus, in the example shown, there are provided a D circuit, a G circuit and an I circuit.

When a pitch order is given to the airplane, which corresponds to a well defined value of the voltage T, it is clear that both rudders G and D must be angularly displaced in the same direction, e. g. downwardly. To this effect, the voltage T will be sent to both circuits G and D with the same polarity. In this case, the said voltage does not react upon the rudder I.

If a warping order is to be given to the airplane, e. g. to cause angular displacement around the roll axis, a voltage R should act upon both rudders D and G in opposite directions and, furthermore, on the rudder I, so as to produce a pure rolling torque. For this purpose, the voltage R will be sent to the circuits D and G with opposite polarities and, furthermore, to the circuit I.

The same is true but with other coefficients when a yaw order is to be given to the airplane in order to produce a pure yawing torque. In this last case, the voltage L will be sent to the three circuits I, G, and D.

Since the motion of the rudder must be stopped when the order has been carried out, the circuits D, G, I are also fed with the follow-up return data issuing from the rudders (channel 301, 302, 303).

There are consequently provided the circuit D fed with the following voltages:

Voltage RD (channel 301)

Voltage —R (voltage R paraphased by means of a phase inverting circuit and fed through a resistor $r_{20}$, a direct amplifier $A_4$, the output of which is returned to its input through a resistor $r_{20'}$.)

Voltage —L (voltage L paraphased by means of a phase inverting circuit similar to the preceding one and, finally Voltage T.

These voltages are fed into a direct current amplifier $A_6$ through respective resistors $r_{21}$ to $r_{24}$.

A resistor $r_{25}$ returns the output of $A_6$ to its input.

There is obtained at the output of $A_6$, a "D actuating voltage" BD (channel 201) having the general form:

$$BD=d_1(RD)-d_2R-d_3L+d_4T \quad (6)$$

which causes a suitable displacement of the rudder D.

The circuit G is fed with the following voltages:

Voltage RG (channel 303)  
Voltage T  
Voltage R  
Voltage L fed into the amplifier $A_7$ respectively through resistors $r_{26}$ to $r_{29}$.

The output of $A_7$ is returned to its input through a resistor $r_{30}$. There is obtained, at the output of $A_7$, the "G actuating voltage" BG (channel 203) which causes a suitable displacement of the rudder G.

The circuit I is fed with the voltages:

RI (channel 302)  
R  
L fed into the amplifier $A_8$, through resistors $r_{31}$ to $r_{33}$. The output put of $A_8$ is returned to its input through a resistor $r_{34}$.

There is obtained at the output of $A_8$ an "I actuating voltage" RI (channel 202) which causes a suitable displacement of the rudder I.

The currents BG, BD, BI are sent from the computer (channels 201, 203, 202) to the transmitter EMS which sends them to the airplane whereon, upon reception, the corresponding orders are carried out by the rudders without any interpretation or correction.

In a general manner, while it has been, in the above description, disclosed what is deemed to be practical and efficient embodiments of the invention, it should be well understood that it is not wished to be limited thereto as there might be changes made in the arrangement, disposition and form of the parts without departing from the principle of the present invention.

In particular, the invention is in no way limited to the described transmission systems and a pulse code multiplex system may be used as well e. g. to avoid jamming. The transmission system may also comprise a change of carrier-wave length controlled by an additional channel, so that the remote control of an airplane may be switched over another remote control station.

The various conventional servo-motors, described as a mere illustration, may be substituted for by equivalent mechanisms ensuring a progressive displacement or again by systems ensuring a step displacement.

The number, nature and the design of the flight condition detectors may be also varied at will. Similarly, the number, the nature and the arrangement of the apparatus provided on the operator's instrument-panel may be modified as required.

It is also possible to vary the number of additional controls as well as to provide supplementary controls (weapons, cameras, etc.). A progressive or step-like control of the gas may be also provided, so that the airplane may be imparted either with a cruising speed or various other ratings.

The computer is not necessarily an electronic computer. Any other type of equivalent calculating machine may be used, such as, for example, a system of mechanical adding units, such as that diagrammatically shown in Fig. 15, wherein servo-motors S ensure a displacement proportional to the incoming voltage. Such displacements are transmitted to a lever system and there is obtained, at the output, a displacement proportional to $a_1i_1+a_2i_2+a_3i_3$ which is transformed into a proportional voltage by means of a potentiometer.

While the operation of the remote control system according to the invention has been described in its application to an airplane provided with control surfaces of special type, it is equally well adapted to be used on an airplane provided with conventional control surfaces including a vertical rudder GD, a horizontal rudder GP and two ailerons AG and AD. In this case, the left hand unit of the computer may be similar to that shown in Fig. 4. This first stage of computation permits obtaining as previously the pitch voltage T (channel 501), the roll voltage R (503) and the yaw voltage L (502). Fig. 14a diagrammatically shows the second unit of the computer which comprises four adding circuits AG, AD, P and D respectively assigned to the left aileron, the right aileron, the horizontal rudder and the vertical rudder. The yaw voltage should cause simultaneously angular displacement of the vertical rudder and warping of the ailerons. For this purpose, the said voltage is fed into the circuits D, AD and AG (with phase-inversion between AG and AD).

The pitch voltage T only acts upon the horizontal rudder circuit. The roll voltage R acts upon the circuits of both ailerons with relatively inverted phases and as a correcting effect on the yaw circuit D.

Without describing the operation of this alternative embodiment in detail, it may be said that the adding circuits effecting additions of the type specified to elaborate the orders to be transmitted to the control surfaces are constituted in the following manner:

*Left aileron AG (amplifier $A_{11}$)*

Input: Followup return data from the left aileron (channel 305) ______________________ RAG
Paraphased roll voltage _____________________ —R
Paraphased yaw voltage _____________________ —L
Output: Voltage for controlling the left aileron (channel 205) ______________________ AG

*Right aileron AD (amplifier $A_{12}$)*

Input: Follow-up return data from the right aileron (channel 306) ______________________ RAD
Roll voltage ________________________________ R
Yaw voltage ________________________________ L
Output: Voltage controlling the right aileron (channel 206) ______________________ AD

*Horizontal rudder GP*

Input: Follow-up return data from the horizontal rudder (channel 307) _________________ RP
Pitch voltage _______________________________ T
Output: Voltage controlling the horizontal rudder (channel 207) ______________________ P

*Vertical rudder GD*

Input: Follow-up return data from the vertical rudder (channel 308) _________________ RD
Yaw voltage ________________________________ L
Roll voltage ________________________________ R
Output: Voltage controlling the vertical rudder (channel 208) ______________________ D The transmission channels 201, 202, 203, 301, 302, 303 are replaced in this alternative embodiment by channels 205, 206, 207, 208, 305, 306, 307, 308. On board the airplane are provided four servo-motors respectively associated with the control surfaces GD, GP, AG, AD and receiving their orders through the channels 205 to 208 as well as well as corresponding follow-up return data signalling the instantaneous positions of the relevant control surfaces through the channels 305 to 308.

What is claimed is:

1. A remote control system permitting of remotely stabilizing, around its roll, pitch and yaw axes, along a predetermined path, an aerodyne having control surfaces capable of varying its angular position around each one of said axes, said system comprising, in combination: on board the aerodyne, detecting means to measure the angular velocity of the aerodyne around each one of said axes and the speed of the aerodyne, indicating means to measure the positions of said control surfaces with respect to the aerodyne, means to transform the said measurements into electrical effects and multiplex radio transmitting means to emit the said electrical effects separately; outside the aerodyne, a remote control station incorporating multiplex radio receiving means to pick up the said electrical effects separately, a computer including reference means to determine the theoretical positions of the control surfaces required for ensuring said aerodyne stabilization, means to compare the said theoretical positions with the actual positions of said control surfaces as read by said indicating means, means to elaborate, in the shape of electrical effects, corresponding correction orders, allowance being made for the readings of said detecting means, and multiplex radio transmitting means to emit the said correction order electrical effects separately; and, on board the aerodyne, multiplex radio receiving means to pick up said correction order electrical effects separately and a plurality of servo-mechanisms adapted to transform the said correction order electrical effects, without any interpretation or correction, into corresponding angular displacements of said control surfaces.

2. A remote control system according to claim 1, wherein said speed measuring detecting means include an indicated air speedometer.

3. A remote control system according to claim 1, in which said speed measuring detecting means include a machmeter.

4. A remote control system according to claim 1, wherein said aerodyne radio transmitting means and control station radio receiving means, on the one hand, and said control station radio transmitting means and aerodyne radio receiving means, on the other hand, are constituted by two frequency-modulated carrier current multiplex systems, each transmission channel being frequency-modulated itself.

5. A remote control system according to claim 1, wherein said aerodyne radio transmitting means and control station radio receiving means, on the one hand, and said control station radio transmitting means and aerodyne radio-receiving means, on the other hand, are constituted by two pulse multiplex systems.

6. A remote control system according to claim 1, wherein the servo-controls of the control surfaces are constituted by irreversible hydraulic servo-motors.

7. A remote control system according to claim 1, wherein said electrical effects are voltages and wherein said computer comprises a plurality of units capable of effecting additions of the type specified to combine said voltages into resulting voltages representing the correction orders to be transmitted to the control surfaces.

8. A remote control system according to claim 7, wherein said voltages are direct current voltages and wherein said adding units are each constituted by a plurality of electronic circuits.

9. A remote control system according to claim 7, wherein said computer is constituted by mechanical calculating means actuated by servo-motors.

10. A remote control system permitting of remotely stabilizing, around its roll, pitch and yaw axes, along a predetermined path an aerodyne having control surfaces capable of varying its angular position around each one of said axes, said system comprising, in combination: on board the aerodyne, detecting means to measure the angular velocity of the aerodyne around said pitch axis, speed measuring means, and a gyrometer to measure the angular velocity of the aerodyne around an axis located in the longitudinal plane of symmetry of the aerodyne and having its orientation chosen according to the characteristics of the aerodyne, in such a manner that its readings be as useful as possible for stabilizing the aerodyne around said roll and yaw axes, indicating means to measure the positions of said control surfaces with respect to the aerodyne, means to transform the said measurements into electrical effects and multiplex radio transmitting means to emit the said electrical effects separately; outside the aerodyne, a remote control station incorporating multiplex radio receiving means to pick up the said electrical effects separately, a computer including reference means to determine the theoretical positions of the control surfaces required for ensuring said aerodyne stabilization, means to compare the said theoretical positions with the actual positions of said control surfaces as read by said indicating means, means to elaborate, in the shape of electrical effects, corresponding correction orders, allowance being made for the readings of said detecting means, gyrometer and speed measuring means, and multiplex radio transmitting means to emit the said correction order electrical effects separately; and, on board the aerodyne, multiplex radio receiving means to pick up said correction order electrical effects separately and a plurality of servo-mechanisms adapted to transform the said correction order electrical effects, without any interpretation nor correction, into corresponding angular displacements of said control surfaces.

11. A remote control system permitting of remotely stabilizing, around its roll, pitch and yaw axes, along a predetermined path, an aerodyne having control surfaces capable of varying its angular position around each one of said axes, said system comprising, in combination: on board the aerodyne, detecting means to measure the angular velocity of the aerodyne around each one of said axes, the acceleration of the aerodyne along each one of said axes and the speed of the aerodyne, indicating means to measure the positions of said control surfaces with respect to the aerodyne, means to transform the said measurements into electrical effects and multiplex radio transmitting means to emit the said electrical effects separately; outside the aerodyne, a remote control station incorporating multiplex radio receiving means to pick up the said electrical effects separately, a computer including reference means to determine the theoretical positions of the control surfaces required for ensuring said aerodyne stabilization, means to compare the said theoretical positions with the actual positions of said control surfaces, as read by said indicating means, means to elaborate, in the shape of electrical effects; corresponding correction orders, allowance being made for the readings of said detecting means, and multiplex radio transmitting means to emit the said correction order electrical effects separately; and, on board the aerodyne, multiplex radio receiving means to pick up said correction order electrical effects separately and a plurality of servo-mechanisms adapted to transform the said correction order electrical effects, without any interpretation or correction, into corresponding angular displacements of said control surfaces.

12. A remote control system permitting of remotely imparting a variable path, with automatic stabilization around its roll, pitch and yaw axes, to an aerodyne having control surfaces capable of varying its angular position around each one of said axes, said system comprising in combination: on board the aerodyne, detecting means to measure the angular velocity of the aerodyne around each one of said axes, its speed, its heading, its longitudinal and transverse flight attitudes and its altitude, indicating means to measure the positions of said control surfaces with respect to the aerodyne, means to transform the said measurements into electrical effects and multiplex radio transmitting means to emit the said electrical effects separately; outside the aerodyne, a remote control station incorporating multiplex radio receiving means to pick up the said electrical effects separately, a computer including adjustable reference means to determine theoretical positions of the control surfaces required for measuring said aerodyne stabilization for each possible configuration of said variable path, means to compare the said theoretical positions with the actual positions of said control surfaces as read by said indicating means, means to elaborate, in the shape of electrical effects, corresponding correction orders, allowance being made for the readings of said detecting means and multiplex radio transmitting means to emit the said correction order electrical effects separately; and, on board the aerodyne, multiplex radio receiving means to pick up said correction order electrical effects separately and a plurality of servo-mechanisms adapted to transform the said correction order electrical effects, without any interpretation or correction, into corresponding angular displacements of said control surfaces.

13. A remote control system according to claim 12, further comprising operator's controlled means to vary the settings of said adjustable reference means, as required for varying said aerodyne path.

14. A remote control system according to claim 12, further comprising operator's controlled means to vary the settings of said adjustable reference means as required for varying said aerodyne variable path and an instrument-panel including apparatus to display the readings of said altitude, heading, speed and flight attitude detecting means.

15. A remote control system according to claim 14, wherein said operator's controlled means include a simulated steering swing-bar and a simulated pilot-stick disposed in the vicinity of said instrument-panel, elastic means to continuously urge said swing-bar and pilot-stick towards neutral position, and potentiometers operatively connected with said swing-bar and pilot-stick to transform the displacements of the same into variable voltages.

16. A remote control system according to claim 12, further comprising at said control station a plurality of separate auxiliary controls, each adapted to generate in the shape of electrical effects, orders for remotely actuating board control mechanisms of the aerodyne, said control station multiplex radio transmitting means and said aerodyne multiplex radio receiving means being adapted to emit and pick up, respectively and separately, the orders from said controls and, on board the aerodyne, a servo-motor responsive to said orders to actuate each of said board control mechanisms, a signal generator associated with each one of said control mechanism to generate a check-signal whenever one of said orders has been carried out, said aerodyne multiplex radio transmitting means and said control station multiplex radio receiving means being adapted to emit and pick up, respectively and separately the check-signals from said signal generator and a signalling device at said remote station to repeat said check-signal.

17. A remote control system according to claim 12, wherein said computer include two units, the first one of which comprises three adding circuits capable of generating, from input data corresponding to the readings of said detecting means and to the settings of said adjustable reference means, three output voltages including a pitch voltage T, a roll voltage R and a yaw voltage L, the values of which determine the direction and extent of the angular displacement to be imparted to the aerodyne around its three pitch, roll and yaw axes, respectively, to bring or maintain said aerodyne on the path corresponding to said reference means settings, while the second unit of said computer comprises a number of adding circuits equal to the number of control surfaces to be actuated, each one of said adding circuits ensuring a combination of the said voltages L, R, T, with voltages representing follow-up return data from said control surface position indicating means to elaborate the final correction orders to be transmitted to said control surfaces.

18. A remote control system according to claim 17, for remotely controlling an airplane having three rudders arranged in an inverted Y configuration, viz., a vertical rudder having its usual function of yaw control and two oblique rudders acting either simultaneously as a conventional horizontal rudder, or pitch control, or separately as warping or roll controls, wherein the said three voltages T, R, L offer the following general forms:

$$T = a_1(OT) + a_2(CT) + a_3(P\Delta) + a_4(\omega T) + a_5(\Gamma N)$$
$$R = b_1(OR) + b_2(CR) + b_3(\omega R) + b_4(\omega L) + b_5(\Gamma T)$$
$$L = c_1(OL) + c_2(CL) + c_3(\omega R) + c_4(\omega L) + c_5(\Gamma T)$$

in which $OT$, $OR$, $OL$ are order voltages $CT$, $CR$, $CL$ adjustment voltages generated by compensating devices $P\Delta$ = a voltage proportional to the dynamic pressure detected by an anemometer $\omega T, \omega R, \omega L$ = voltages proportional to the pitch, roll and yaw angular speeds detected by suitable apparatus $a_1-a_2$ etc. $b_1-b_2$ etc. $c_1-c_2$ etc. coefficients $\Gamma N, \Gamma T$ = voltages proportional to the normal and transverse accelerations the voltages to be transmitted to the control surfaces BI, BG, BD offering, furthermore, the following forms:

$$(BD) = d_1(RD) - d_2R - d_3L + d_4T$$
$$(BG) = e_1(RG) + e_2T + e_3R + e_4L$$
$$(BI) = f_1(RI) + f_2R + f_3L$$

RD, RG and RI being voltages generated by the control surface position detectors and $d_1 \ldots e_1 \ldots f_1 \ldots f_3$ being coefficients.

19. A remote control system according to claim 17, for remotely controlling an airplane having conventional control surfaces including a horizontal rudder, a vertical rudder and two ailerons, wherein said computer second unit comprises four adding circuits giving output voltages for controlling the horizontal and vertical rudders (BGP, BGD) and the left and right ailerons (BAG, BAD), said output voltages offering the following general forms:

$$(BGP) = g_1(RP) + g_2T$$
$$(BGD) = h_1(RD) + h_2L + h_3R$$
$$(BAG) = i_1(RAG) - i_2L - i_3R$$
$$(BAD) = j_1(RAD) + j_2L + j_3R$$

RP, RD, RAG, RAD being voltages indicating the position of the control surfaces and $g_1, g_2 \ldots i_3$ being coefficients.

References Cited in the file of this patent

UNITED STATES PATENTS

| | | |
|---|---|---|
| 2,515,254 | Nosker | July 18, 1950 |
| 2,594,305 | Haller | Apr. 29, 1952 |

OTHER REFERENCES

Guided Weapons Telemetering; Flight, Oct. 23, 1953, pp. 556–558.